United States Patent
Gado et al.

(10) Patent No.: US 12,217,012 B1
(45) Date of Patent: Feb. 4, 2025

(54) CLASSIFYING FEEDBACK FROM TRANSCRIPTS

(71) Applicant: Intuit Inc., Mountain View, CA (US)

(72) Inventors: Nitzan Gado, Petah Tikva (IL); Adi Shalev, Hertzliya (IL); Talia Tron, Petah Tikva (IL); Noa Haas, Petah Tikva (IL); Oren Dar, Petah Tikva (IL); Rami Cohen, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/362,896

(22) Filed: Jul. 31, 2023

(51) Int. Cl.
*G06F 40/40* (2020.01)
*G06F 16/35* (2019.01)
*G06F 40/131* (2020.01)
*G06F 40/289* (2020.01)

(52) U.S. Cl.
CPC ............ *G06F 40/40* (2020.01); *G06F 16/355* (2019.01); *G06F 40/131* (2020.01); *G06F 40/289* (2020.01)

(58) Field of Classification Search
CPC ....... G06F 40/40; G06F 16/355; G06F 40/131
See application file for complete search history.

(56) References Cited

U.S. PATENT DOCUMENTS

| | | | |
|---|---|---|---|
| 2021/0182935 A1* | 6/2021 | Malkiel | G06F 16/3347 |
| 2022/0230089 A1* | 7/2022 | Peraud | G06N 3/084 |
| 2023/0034085 A1 | 2/2023 | Shalev | |
| 2023/0297778 A1* | 9/2023 | Can | G10L 15/16 704/232 |
| 2023/0401386 A1* | 12/2023 | Wang | G06N 5/01 |

\* cited by examiner

*Primary Examiner* — Thomas H Maung
(74) *Attorney, Agent, or Firm* — Lathrop GPM LLP (57) ABSTRACT

A method classifies feedback from transcripts. The method includes receiving an utterance from a transcript from a communication session and processing the utterance with a classifier model to identify a topic label for the utterance. The classifier model is trained to identify topic labels for training utterances. The topic labels correspond to topics of clusters of the training utterances. The training utterances are selected using attention values for the training utterances and clustered using encoder values for the utterances. The method further includes routing the communication session using the topic label for the utterance.

18 Claims, 8 Drawing Sheets

DON'T UNDERSTAND 302

I'M SORRY, BUT I DID NOT UNDERSTAND

WHAT YOU'RE SAYING. I DON'T UNDERSTAND WHAT ARE YOU SAYING?

I'M SORRY. I CAN'T UNDERSTAND YOU.

OKAY, I'M I'M HAVING A LOT OF TROUBLE UNDERSTANDING YOU. WHAT ARE YOU SAYING?

I'M SORRY, I DIDN'T UNDERSTAND YOU.

UM, I'M SORRY. YOU'RE GONNA HAVE TO ASK ME THAT AGAIN. I'M HAVING A REALLY HARD TIME UNDERSTANDING YOU.

PRODUCT SATISFACTION 308

SO LIKE I CAN'T USE THE PRODUCT ANYMORE, IS THAT WHAT YOU'RE SAYING?

OKAY, THAT ANSWERED MY QUESTION. I JUST NEED TO DO SOMETHING ELSE AND JUST GET RID OF THIS PRODUCT PERIOD. THIS IS RIDICULOUS.

I'M A LITTLE FRUSTRATED WITH THIS PRODUCT BUT OTHERWISE I'M GOOD, HOW ARE YOU?

I THINK WE'RE DEALING WITH TWO DIFFERENT VERSIONS OF THIS PRODUCT

TOO LONG TO SOLVE 315

WELL I'VE BEEN WORKING ON IT FOR FOUR DAYS,

OKAY. SO SO IT'S ALREADY BEEN TWO BUSINESS DAYS. SO I GOTTA WAIT THREE MORE.

SO I"VE BEEN OUT SATURDAY, SUNDAY, MONDAY. I'VE BEEN OUT FOR FOUR DAYS RIGHT NOW

WELL, HOPEFULLY IT'S REALLY THREE DAYS AND, UH, NOT THREE MONTHS AS IT'S BEEN.

(NO CALL BACK 305)

(SPEAK TO SOMEONE ELSE 310)

(RIDICULOUS 312)

(VOICEMAIL 318)

CLASSIFYING FEEDBACK FROM TRANSCRIPTS

BACKGROUND

Language models are machine learning models that are used to analyze textual data. Language models continue to improve—the larger models becoming larger and larger to the point where the models may have millions to billions of parameters trained on trillions of inputs. The larger a model becomes, the longer the amount of time necessary to expend for generating an output for the model becomes. A challenge is to analyze large amounts of data in a reasonable amount of time and to analyze certain instances of data in real time.

SUMMARY

In general, in one or more aspects, the disclosure relates to a method that classifies feedback from transcripts. The method includes receiving an utterance from a transcript from a communication session and processing the utterance with a classifier model to identify a topic label for the utterance. The classifier model is trained to identify topic labels for training utterances. The topic labels correspond to topics of clusters of the training utterances. The training utterances are selected using attention values for the training utterances and clustered using encoder values for the utterances. The method further includes routing the communication session using the topic label for the utterance.

In general, in one or more aspects, the disclosure relates to a system that classifies feedback from transcripts. The system includes at least one processor and an application, which may execute on the at least one processor. The system receives an utterance from a transcript from a communication session and processes the utterance with a classifier model to identify a topic label for the utterance. The classifier model is trained to identify topic labels for training utterances. The topic labels correspond to topics of clusters of the training utterances. The training utterances are selected using attention values for the training utterances and clustered using encoder values for the utterances. The system further routes the communication session using the topic label for the utterance.

In general, in one or more aspects, the disclosure relates to a method of training. The method includes processing training transcript scores to select a set of selected transcripts from a set of training transcripts, processing the set of selected transcripts using attention values to identify training utterances, and clustering encoder values of the training utterances to generate the clusters. The method further includes assigning topic labels to topics. One of the topics corresponds to one or more of the clusters from the set of clusters. The method further includes training a classifier model to identify training labels for the training utterances by using a processor to update one or more weights of the classifier model.

Other aspects of the one or more embodiments will be apparent from the following description and the appended claims.

BRIEF DESCRIPTION OF DRAWINGS

Like elements in the various figures are denoted by like reference numerals for consistency.

DETAILED DESCRIPTION

In general, one or more embodiments are directed to classifying feedback from transcripts. Processing the transcripts with language models may be impractical to do based on the volume of data or speed at which responses are to be provided. For example, a user may call in (or engage a chatbot) to request help using a software product or service. The interaction may be transcribed in real time but processing the transcript using a sufficiently accurate language model may not be reasonable for providing a response in sufficient time to the user. Instead of using the language model to process the transcript, a smaller and faster classifier model may be used to provide real-time feedback. A challenge then comes from leveraging the accuracy of the language model, which may be a large language model (LLM) with billions of parameters trained on trillions of inputs, to create a classifier that may operate on the transcripts in real time.

As discussed below in relation to the various figures and associated description, a machine learning model is used to analyze and select the utterances from transcripts. In one embodiment, the machine learning model is a classifier that assigns attention weights to the utterances. Using output from the model, the utterances are clustered into topics that are identified with topic labels. In one embodiment, after the clustering is performed, a user may select a subset of clusters for the system to use instead of using each of the clusters. The pairs of utterances and labels may then be used as a data set to train a classifier that may be used to analyze transcripts more quickly when compared to using a language model.

Figure 1:
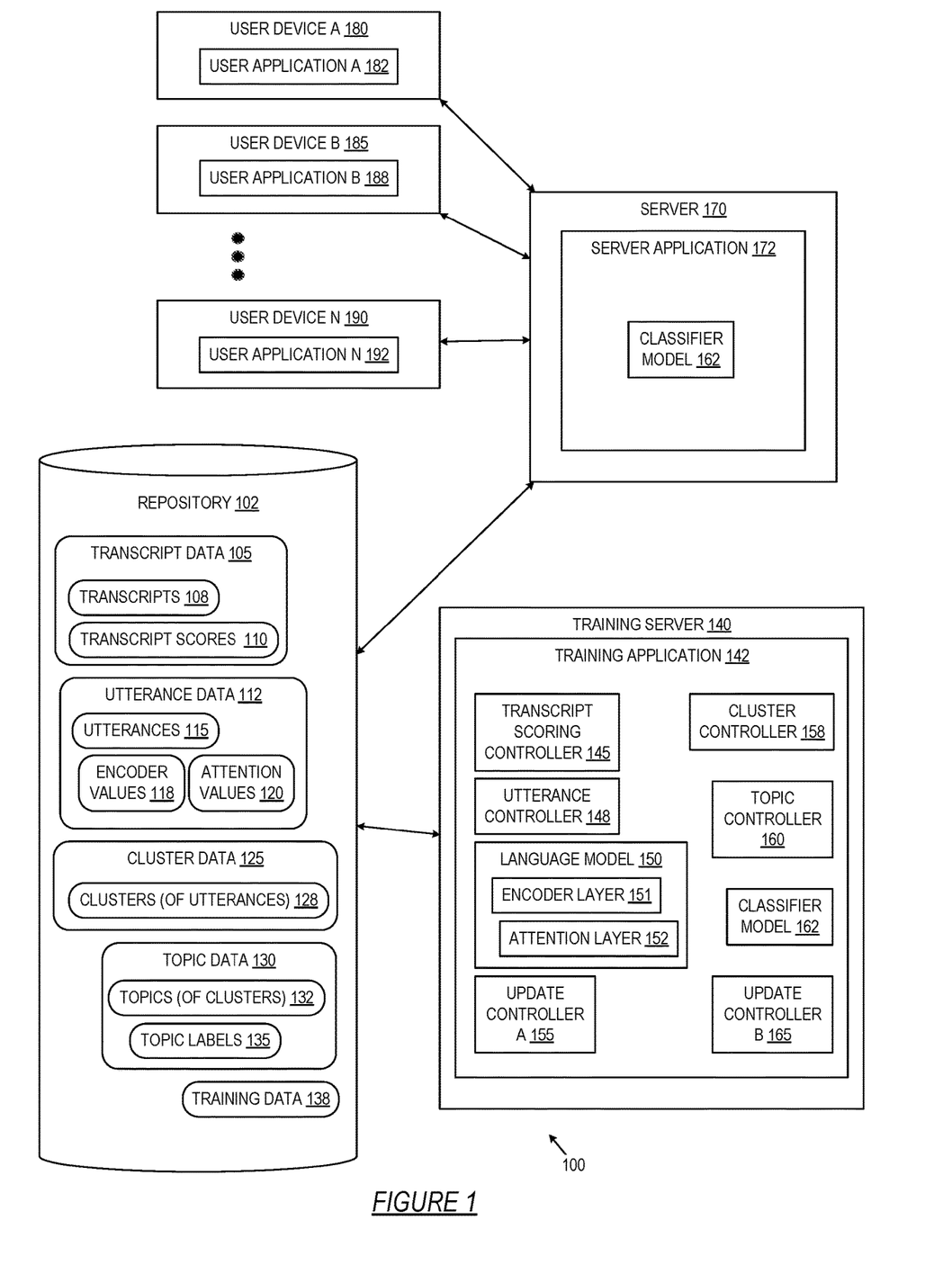
FIG. 1 shows a computing system, in accordance with one or more embodiments of the disclosure.

Turning to FIG. 1, the system (100) is a computing system shown in accordance with one or more embodiments. The system (100) includes a data repository (102). The data repository (102) is a type of storage unit and/or device (e.g., a file system, database, data structure, or any other storage mechanism) for storing data. The data repository (102) may include multiple different, potentially heterogeneous, storage units and/or devices.

The data repository (102) stores the transcript data (105). The transcript data (105) is natural language text that may be received from a user devices operated by a users. The transcript data (105) is collected from communication sessions and includes the transcripts (108) and the transcript scores (110).

The transcripts (108) are the text of the communication sessions. The transcripts (108) may include transcripts of phone calls and transcripts of text messages. As an example, the transcript below may be from a call or text conversation.

1 user: hello there
2 agent: hello, how may I help you today?
3 user: I have a few things to discuss. A few things that need improvement The transcript scores (110) are scores for the transcripts (108). In one embodiment, the transcript scores (110) are net promoter scores (NPS) that identify whether the user from a transcript will be a net promoter of the product or service. In one embodiment, a net promoter score is a value from 1 to 10 with values from 1 to 6 indicating that the user may be a net detractor who is generally dissatisfied with the product or service. Values from 7 to 10 may indicate that the user is a net promoter who is generally satisfied with the product or service. One of the transcript scores (110) may correspond to one of the transcripts (108) and to multiples of the utterances (115).

The data repository (102) also stores the utterance data (112). The utterance data (112) includes the utterances (115) and data related to the utterances (115). The utterances (115) are stings of text from the transcripts (108). One of the utterances (115) may include one or more sentences of a party of a communication session. From the example above, the lines 1 and 3 may each be an utterance from a user. The line 2 may be an utterance from an agent, which may be a person or a chatbot.

Continuing with FIG. 1, the encoder values (118) are values that encode the text of the utterances (115). An encoder value may be generated for a set of characters (e.g., a letter, a word, a group of words, etc.) extracted from an utterance. In one embodiment, an encoder value is a set of vectors of values that identify the semantic meanings of sets of characters from an utterance. From the example above, the first utterance "hello there" may be encoded to a value that includes a vector numerically identifying the semantic meaning for the word "hello" and another vector numerically identifying the semantic meaning for the word "there".

The attention values (120) are values of attention for the encoder values (118). In one embodiment, one of the attention values (120) quantifies an amount of attention for one of the encoder values (118). An attention value may be a real number from the continuous range 0 to 1 that is the sum of attention weights for the vectors of an encoder value. From the example above, the attention value for the first utterance ("hello there") may be a value from 0 to 1 that is the sum of the attention weights for the vectors for the words "hello" and "there". Similarly, the attention value for the third utterance ("I have a few things to discuss. A few things that need improvement") may be a value from 0 to 1 that is the sum of the attention weights for the vectors for the words from the utterance.

The data repository (102) stores the cluster data (125). The cluster data (125) includes the clusters (128). The clusters (128) are groups of utterances with similar semantic meaning. In one embodiment, a cluster may be identified by a centroid of encoder values of the utterances that form a cluster. The centroid may have the same number of dimensions as an encoder value for an utterance.

Continuing with FIG. 1, the data repository (102) stores the topic data (130). The topic data (130) includes the topics (132) and the topic labels (135). The topics (132) are groups of the clusters (128). One of the topics (132) may include multiple ones of the clusters (128). In one embodiment, no two topics include the same cluster. In one embodiment, a topic is a group of clusters that have a similar semantic meaning. The topic labels (135) are identifiers for the topics (132). In one embodiment, a label for a topic may include a unique number that distinguishes one label from another add may include a name for the label. A name for a label may be a representative utterance for a topic, which may be the utterance with an encoder value closest to the centroids of the clusters of a topic.

The data repository (102) stores the training data (138). The training data (138) is data used to train the machine learning models of the system (100), which may include the language model (150) and the classifier model (162). The training data (138) may include historical records of the transcript data (105), the utterance data (112), the cluster data (125), the topic data (130), etc.

The system (100) may include the training server (140). The training server (140) is one or more computing systems, possibly in a distributed computing environment. An example of the training server (140) may be the computing system shown in FIG. 5A. The training server (140) may host and/or execute one or more processes, software, applications, etc. For example, the training server (140) may include the training application (142). The training application (142) includes software or application specific hardware programmed, when executed by a processor, to train one or more of the machine learning models described herein.

The training application (142) may include the transcript scoring controller (145). The transcript scoring controller (145) filters the transcripts (108) using the transcript scores (110). The transcript scoring controller (145) may filter the transcripts (108) using a threshold. For example, the transcript scoring controller (145) may use a threshold of 7 and include the transcripts that have scores lower than the threshold of 7, which includes transcripts with scores of 1-6. The training application (142) may include the utterance controller (148). The utterance controller (148) generates the utterances (115) from the transcripts (108). The utterance controller (148) may also filter the utterances (115) by the creator of the utterance. For example, the utterance controller (148) may remove utterances that were not provided by a user to focus the system (100) on analyzing the sentiments of the users of the system (100) instead of on analyzing the sentiments of the providers and agents of the system (100). The training application (142) may include the language model (150). The language model (150) generates the encoder values (118) and the attention values (120) from the utterances (115). The language model (150) may be a large language model (LLM), examples of which include generative pre-trained transformer (GPT) models. In one embodiment, the language model (150) is a pretrained model. In one embodiment, the language model (150) is trained on the utterance data (112) or the transcript data (105) to predict words that have been masked from the input or for next word prediction.

The language model (150) may include the encoder layer (151). The encoder layer (151) converts the utterances (115) to the encoder values (118). In one embodiment, the encoder layer (151) may use forward propagation to map the words from one of the utterances (115) to the vectors of the set of vectors that forms one of the encoder values (118). The language model (150) may include the attention layer (152). The attention layer (152) generates the attention values (120) for the encoder values (118). In one embodiment, the attention layer (152) may be part of a transformer model that forms the language model (150). In one embodiment, the attention layer (152) may be the last attention layer of a plurality of attention layers within the language model (150).

Continuing with FIG. 1, the training application (142) may include the cluster controller (158). The cluster controller (158) generates the clusters (128) from the utterances (115) using the attention values (120) and the encoder values (118). In one embodiment, the cluster controller (158) filters the utterances (115) using the attention values (120) and the filtered utterances using the encoder values (118). In one embodiment, the number of clusters may be a hyperparameter. In one embodiment, the number of clusters determined dynamically. In one embodiment, the k-means clustering algorithm may be applied to the encoder values (118) to cluster the utterances (115).

The training application (142) may include the topic controller (160). The topic controller (160) generates the topics (132) from the clusters (128). In one embodiment, the topic controller (160) receives input from a developer of the system (100) to identify which ones of the clusters (128) form one of the topics (132). In one embodiment, the topic controller (160) may automatically generate the topics (132) from the clusters (128) by combining clusters with centroids within a threshold distance. The topic controller (160) may map the correspondences between ones of the utterances (115) and ones of the topic labels (135).

The training application (142) may include the classifier model (162). The classifier model (162) is a machine learning model that classifies utterances by predicting the labels for the utterances. In one embodiment, the classifier model (162) is trained with pairs of the utterances (115) and the topic labels (135) to predict the topic labels (135) from the utterances (115). The training application (142) may include the update controller A (155). The update controller A (155) updates the language model (150) during training. In one embodiment, the update controller A (155) may update the weights and parameters of the language model (150), including the weights and parameters of the encoder layer (151) and the attention layer (152). In one embodiment, the update controller A (155) uses backpropagation to update the weights and parameters of the language model (150).

The training application (142) may include the update controller B (165). The update controller B (165) updates the classifier model (162) during training. In one embodiment, the update controller B (165) may update the weights and parameters of the classifier model (162). In one embodiment, the update controller B (165) uses backpropagation to update the weights and parameters of the classifier model (162).

Continuing with FIG. 1, the system (100) also may include the server (170). The server (170) is one or more computing systems, possibly in a distributed computing environment. An example of the server (170) may be the computing system shown in FIG. 5A.

The server (170) may host and/or execute one or more processes, software, applications, etc. For example, the server (170) may include the server application (172). The server application (172) includes software or application specific hardware programmed, when executed by a processor, to use one or more of the machine learning models described herein. The server (170) may interact with the user devices A (180) and B (185) through N (190) to generate and process the transcripts (108) in real time.

The server application (172) may include the classifier model (162). The classifier model (162) is a trained machine learning model that classifies utterances from transcripts generated by interactions with the user devices A (180) and B (185) through N (190). The classifier model (162) predicts the labels for the utterances from users through the user devices A (180) and B (185) through N (190). The server application (172) may perform actions based on the labels identified by the classifier model (162).

The system (100) may include one or more of the user devices A (180) and B (185) through N (190). The user devices A (180) and B (185) through N (190) are computing systems (desktops, laptops, mobile phones, tablets, etc.) that are operated by users or by automated processes (e.g., other software that may generate the user input (102)). In one embodiment, the one or more of the user devices A (180) and B (185) through N (190) may include remote devices that are not under the control of the entity that manages the servers of the system (100).

Continuing with FIG. 1, the user devices A (180) and B (185) through N (190) may interact with the server (170) with communication sessions. Examples of communication sessions include phone calls and text messaging sessions. Transcripts from the communication sessions for the transcript data (105). The user devices A (180) and B (185) through N (190) may include the user applications A (182) and B (188) through N (192). The user applications A (182) and B (188) through N (192) includes software or application specific hardware programmed, when executed by a processor, to established communication sessions and interact with the server (170).

In one embodiment, the user device N (190) may be referred to as a facilitator device that is operated by a user that is a facilitator. Communication sessions with the user devices A (180) and B (185) may be routed to include the user device N (190) for the facilitator to answer questions from the users of the user devices A (180) and B (185).

Although described within the context of a client server environment with servers and user devices, aspects of the disclosure may be practiced with a single computing system and application. For example, a monolithic application may operate on a computing system to perform the same functions as one or more of the user application A (182), the server application (172), and the training application (142).

Figure 2A:
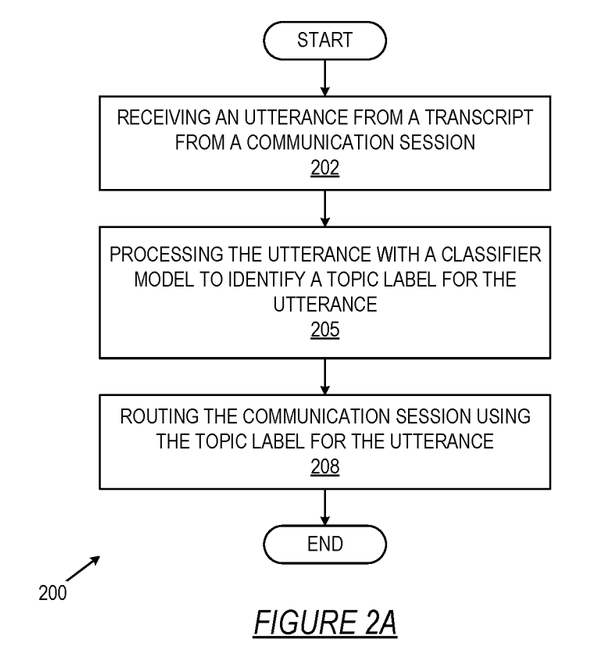
FIG. 2A and FIG. 2B show methods in accordance with one or more embodiments of the disclosure.

Turning to FIG. 2A, the method (200) of classifying feedback from transcripts is in accordance with one or more embodiments. The method (200) may be performed using the system (100) of FIG. 1.

Step 202 of the process (200) includes receiving an utterance from a transcript from a communication session. The communication session may include a call, text messaging, combinations thereof, etc. A call may be a voice call, a video conference, etc. Text messaging may include short message service (SMS) messages, social media messages, email messages, chatbot messages, etc. In one embodiment, the transcript may be generated from the communication session by transcribing voices from the communication session. In one embodiment, the transcript may be a collection of text messages transmitted back and forth between a user and a system. The transcript may include text from multiple participants, which include a user and may include an agent or chatbot of the system. An utterance may be extracted from a transcript by filtering the transcript for a block of text from a user that is between text from other participants recorded in the transcript.

Step 205 of the process (200) includes processing the utterance with a classifier model to identify a topic label for the utterance. The classifier model is trained to identify topic labels for training utterances. The topic labels correspond to topics of clusters of the training utterances. The training utterances are selected using attention values for the training utterances and clustered using encoder values for the utterances. Training the classifier model is further described with FIG. 2B. In one embodiment, the input to the classifier model is a string of text (an utterance) and the output is a prediction of a topic label (e.g., a categorical value or string of text that identifies a topic label) that corresponds to the input string of text.

In one embodiment, the classifier model includes an encoder layer and a classification layer. The encoder layer may include a sentence transformer and the classification layer may include a classification head. The sentence transformer may be a fine tuned transformer model that include a pretrained transformer model that is further trained (fine tuned) using the utterances from the training data for the classification model. The sentence transformer may take a string of text (e.g., an utterance) as input and output a set of vectors in which the vectors correspond to words from the string of text. The classification head may be an attention head or a linear layer that processes the outputs of the sentence transformer to output a prediction of a topic label for the original input to the sentence transformer.

Continuing with FIG. 2A, Step 208 of the process (200) includes routing the communication session using the topic label for the utterance. In one embodiment, the topic labels may correspond to an issue that a user is having with the system. The system may map different topic labels to the performance of different actions. In one embodiment, routing the communication session to include a facilitator device using the topic label. For example, a first group of topic labels may indicate that the user is having issues with understanding an agent or chatbot, product satisfaction, or taking too long to resolve an issue and the system may map the topic labels corresponding to these issues to routing the communication session with the user to a facilitator device. The facilitator device may be a user device operated by a facilitator who is a person that may then respond to and help the user with an issue. For other topic labels, the system may continue to route the communication session through a chatbot to respond to the user in the communication session.

Figure 2B:
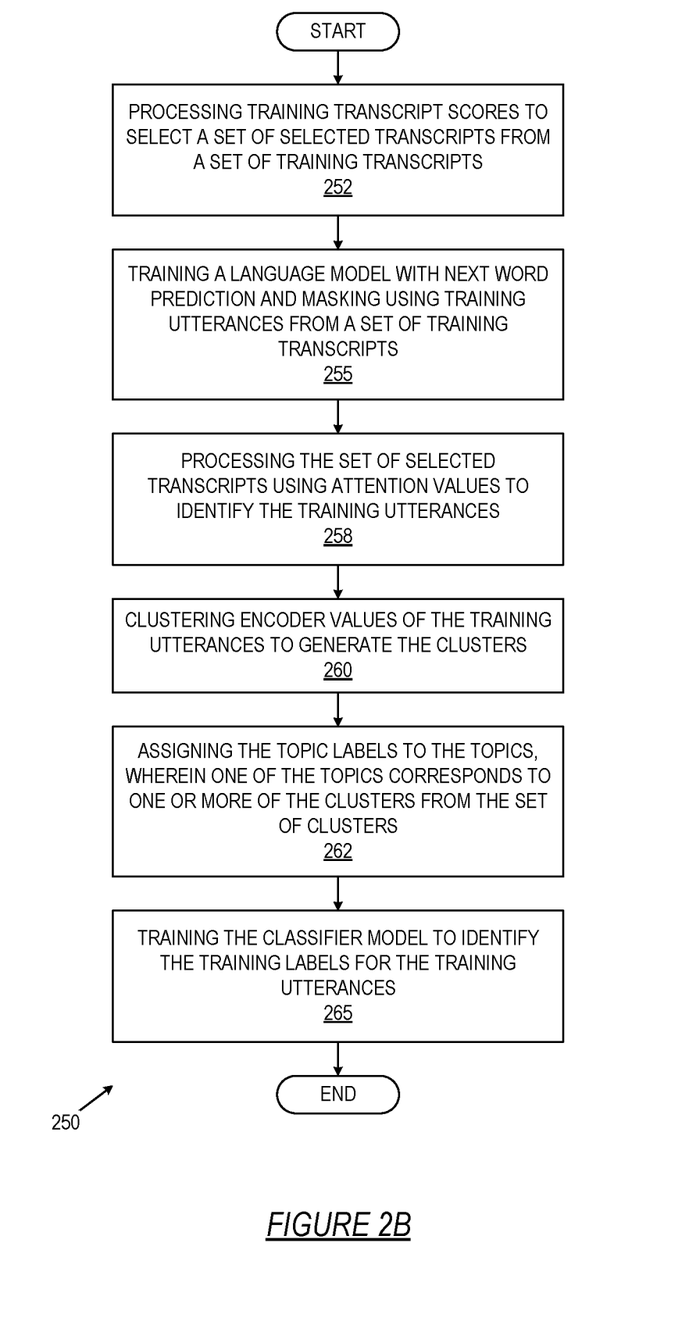

Turning to FIG. 2B, the method (250) trains a classification model, in accordance with one or more embodiments. The method (250) may be performed using the system (100) of FIG. 1.

Step 252 of the process (250) includes processing training transcript scores to select a set of selected transcripts from a set of training transcripts. The training transcripts may be historical transcripts of previous communication sessions between users and the system. Each of the training transcripts may be labeled with a training transcript score. The value of the transcript score may be used to select the transcripts.

In one embodiment, a transcript score may be a detractor net promoter score that identifies if the user, from the transcript, will be a net detractor or a net promoter of the product or service being accessed by the user. In one embodiment, the transcript score may be in the range from 1 to 10 with values from 1 to 4 indicating that the user will be a detractor of the service, values from five to six indicating that the user is neutral towards the service (i.e., not a promotor), and values from 7 to 10 indicating that the user will be a promoter of the service. Different values and ranges may be used in accordance with embodiments of the disclosure. Using the detractor net promoter score described above, transcripts having scores from 1 to 6 may be selected.

In one embodiment, the scores for the training transcripts may be generated with a machine learning model. The training transcripts may be processed to generate the training transcript scores using a detractor net promotor model (a machine learning model) that uses an attention layer and is trained to predict the training transcript scores from the training transcripts. The detractor net promotor model may be updated during training based on comparisons of the training transcript scores output from the detractor net promotor model to labeled transcript scores that have been previously identified for the training transcripts.

Continuing with FIG. 2B, Step 255 of the process (250) includes training a language model with next word prediction and masking using training utterances from a set of training transcripts. Training with next word prediction may input a text string to the language model to have the language model predict the next word after the text string. Training with masking may delete a word from the text string input to the language model to have the language model predict the word that was deleted. In one embodiment, the language model generates the attention values with an attention layer and generates the encoder values with an encoding layer. In one embodiment, training the language model updates one or more of the attention layer and the encoding layer. The training may use backpropagation to update the weights and parameters of the layers of the language model. Backpropagation may identify errors between the outputs of the language model and the expected outputs of the language model and then propagate updates based on the error backwards through the layers of the language model.

Step 258 of the process (250) includes processing the set of selected transcripts using attention values to identify the training utterances. The attention values are generated by a language model using an attention layer of the attention model.

In one embodiment, an attention threshold number of the training utterances are selected from one of a selected transcript of the set of selected transcripts. For example, an attention threshold of 3 may be used to select the 3 utterances with the highest attention values from a transcript.

Step 260 of the process (250) includes clustering encoder values of the training utterances to generate clusters. The encoder values correspond to the training utterances and are generated by the language model from the training utterances. Each cluster may be defined by a centroid that is the average of the encoder values for the cluster.

In one embodiment, a cluster threshold number of the clusters are generated. For example, a cluster threshold of 50 may be used to generate 50 clusters for the utterances. In one embodiment, the cluster threshold may be dynamic.

Step 262 of the process (250) includes assigning the topic labels to the topics. One of the topics corresponds to one or more of the clusters from the set of clusters generated for the utterances from the encoder values.

In one embodiment, the topics are selected based on similarity between the clusters. For example, clusters with centroids that are less than a threshold distance apart may be combined into a single topic. In one embodiment, a developer may identify clusters that are combined to form topics.

Step 265 of the process (250) includes training the classifier model to identify the training labels for the training utterances. The classifier model is a few shot machine learning model that may be sufficiently trained using fewer than millions of examples and may trained use as few as tens to hundreds of examples and have sufficient accuracy (e.g., an accuracy greater than 80%).

In one embodiment, a sample threshold number of utterances for each of the topics is selected to use to train the classifier model. For example, 100 utterances for each topic may be selected to be used to train the classifier model.

Figure 3A:
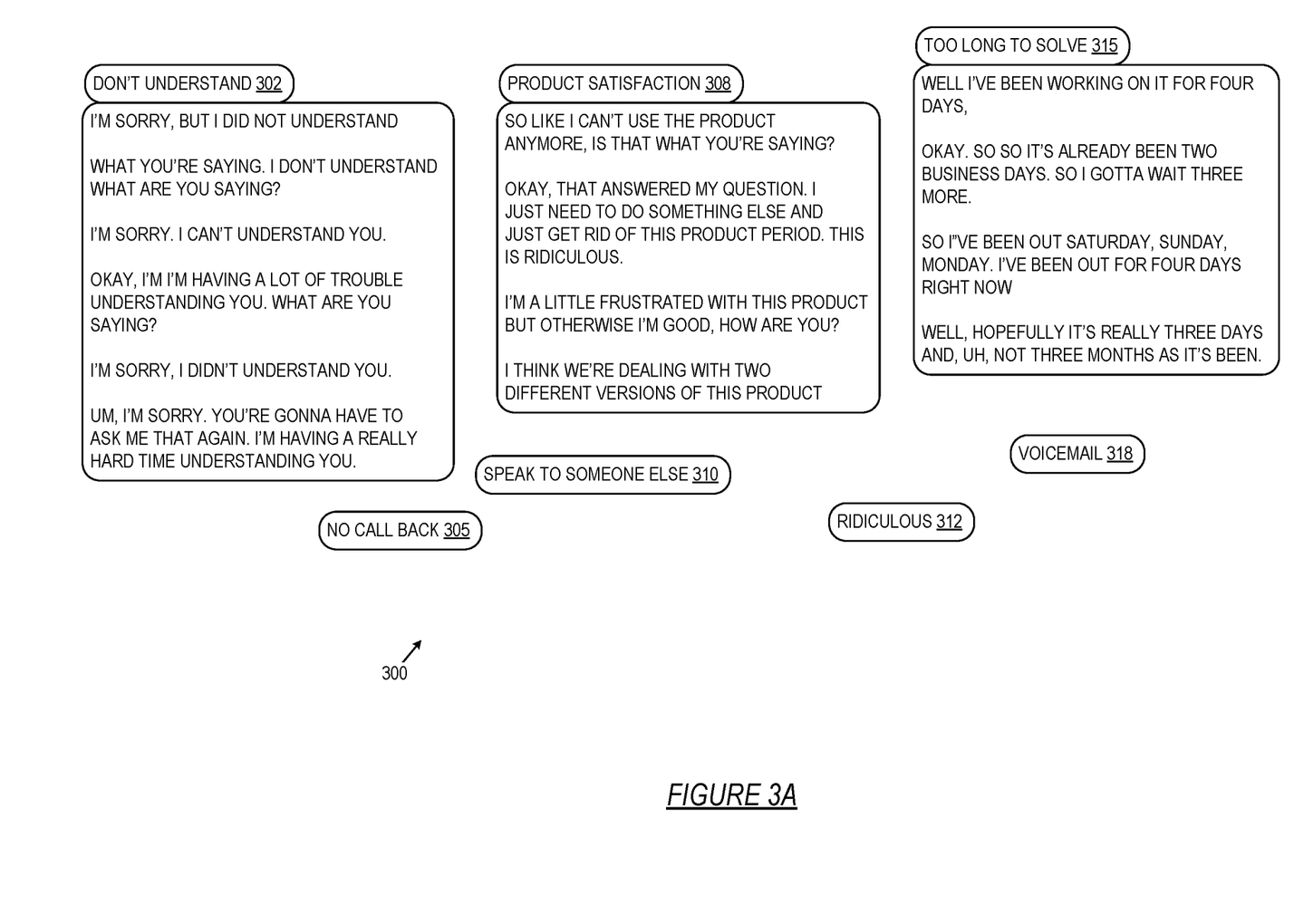
FIG. 3A, FIG. 3B, FIG. 3C, FIG. 3D, FIG. 4A, and FIG. 4B show examples in accordance with one or more embodiments of the disclosure.

Turning to FIG. 3A, the topics (300) are generated from the utterances of transcripts from communication sessions of users with a system. Generation of the topics (300) and the usage of the topics (300) to train machine learning models is further described with FIG. 3B, FIG. 3C, and FIG. 3D below.

The utterances for the topics (300) were selected from transcripts with low transcript scores. The low transcript scores (e.g., transcript scores in the range of 1 to 6 from a detractor net promotor model using a range of 1 to 10) may indicate the user is a net detractor from the product or service that the discussed during a communication session (e.g., a call).

The topics (300) include the topic (302), (305), (308), (310), (312), (315), and (318). The topic (302) is identified by the text label "don't understand" that describes the types of utterances within the topic (302). Utterances included within the topic (302) include "I'm sorry, but I did not understand", "I'm sorry. I can't understand you.", etc. The topic (305) is identified by the text label "no call back", which may indicate that the user has requested to not receive a call back.

Figure 3B:
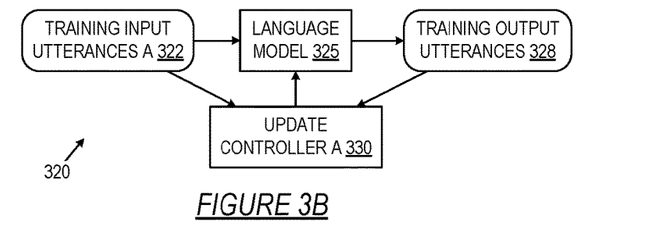

Turning to FIG. 3B, the sequence (320) depicts a flow of data for a method of training the language model (325), in accordance with one or more embodiments. The language model (325) may be trained before training the classifier model (382) of FIG. 3D. The sequence (320) may be performed using the system (100) of FIG. 1.

The training input utterances A (322) are input to the language model (325). The training input utterances A (322) may be from historical transcripts that are unfiltered with respect to transcript scores and may or may not have corresponding transcript scores.

The language model (325) processes the training input utterances A (322) to generate the training output utterances (328). The language model (325) may be a text in text out model that receives text (the training input utterances A (322)) as input and outputs text (the training output utterances (328)). Words from the training input utterances A (322) may be masked (removed) to train the language model (325) to predict the masked words. The language model (325) may also be trained to predict the next word given an input sequence of text (e.g., the training input utterances A (322)).

The training output utterances (328) are the outputs from the language model (325). The training output utterances (328) are text strings generated from the text strings of the training input utterances A (322).

The update controller A (330) updates the weights and parameters of the language model (325) based on the training input utterances A (322) and the training output utterances (328). The output of the language model (325) may be compared with expected output based on the input to the language model (325). For example, an utterance may have one or more words masked and the masked version is input to the language model (325). The output from the masked input is compared an expected output that may include the words that were masked out and the next word after the input. Error is calculated from the difference between the output of the language model (325) with respect to the expected output that is backpropagated through the language model (325). Backpropagation updates the weights and parameters of the layers of the language model (325), which may include an encoder layer and an attention layer to improve the accuracy of the language model (325) in predicting masked words and next words.

Figure 3C:
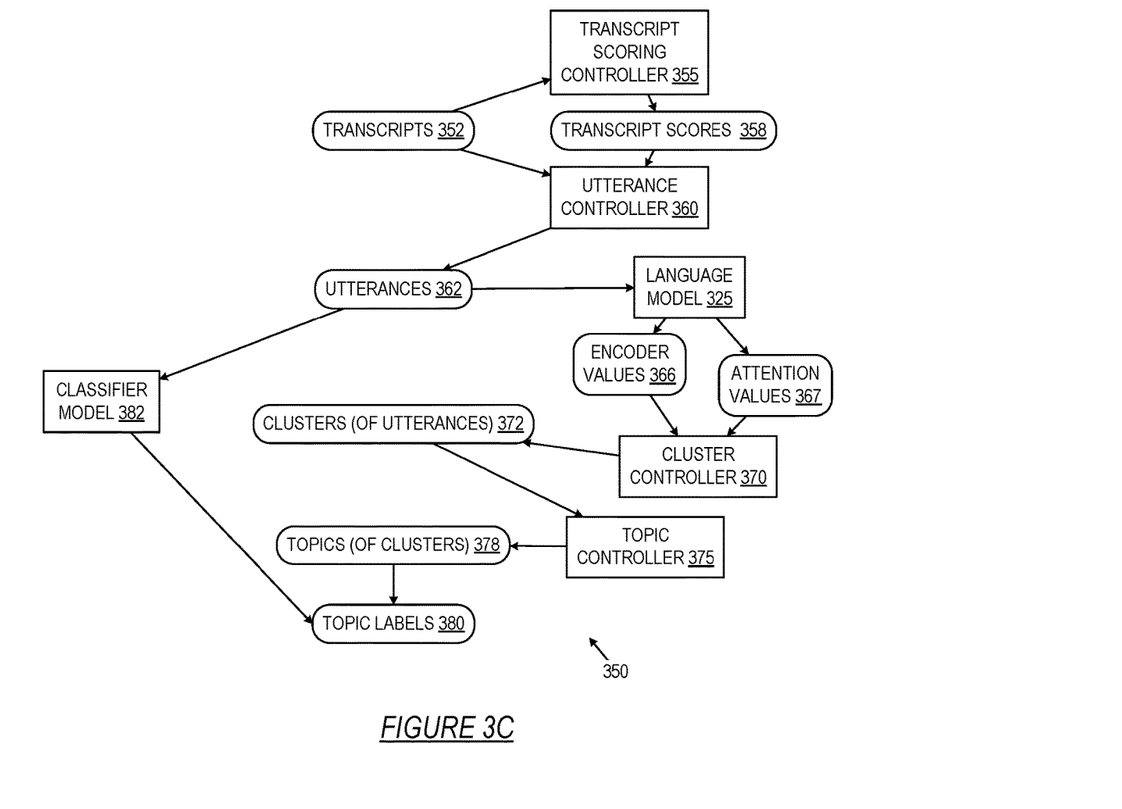

Turning to FIG. 3C, the sequence (350) depicts a flow of data for generating a set of training data used to train the classifier model (382). The sequence (350) may be performed using the system (100) of FIG. 1.

The transcripts (352) are inputs to the transcript scoring controller (355) and the utterance controller (360). The transcripts (352) include text strings from communication sessions of users of the system. Each of the transcripts (352) may include multiple utterances and each utterance may include multiple sentences.

The transcript scoring controller (355) receives the transcripts (352) and outputs the transcript scores (358). In one embodiment, the transcript scoring controller (355) may process the transcripts (352) to generate the transcript scores (358), which may be performed using a machine learning model trained to predict the transcript scores (358) from the transcripts (352). In one embodiment, the transcript scoring controller (355) may collect the transcript scores (358) from user inputs that identify the transcript scores for respective transcripts.

The utterance controller (360) receives the transcripts (352) and the transcript scores (358) and outputs the utterances (362). In one embodiment, the utterance controller (360) filters the transcripts (352) based on the transcript scores (358) using a transcript score threshold. In one embodiment, the transcript score threshold identifies a range of detractor net promotor scores.

The utterances (362) are outputs from the utterances (362) and inputs to the language model (325). The utterances (362) are extracted from the transcripts (352) using the transcript scores (358). For example, each of the utterances (362) may be from ones of the transcripts (352) that correspond to transcript scores that satisfy the transcript score threshold.

The language model (325) receives the utterances (362) and generates the encoder values (366) and the attention values (367). While the output of the language model (325) is a text string that includes the next word predicted for one of the utterances (362), the language model (325) generates the encoder values (366) and the attention values (367) as intermediate values in order to generate the output. The encoder values (366) and the attention values (367) are input to the cluster controller (370).

The cluster controller (370) receives the attention values (367) and the encoder values (366) for the utterances (362) to identify the clusters (372) of the utterances (362). The cluster controller (370) may filter the utterances (362) using the attention values (367) and then cluster the remaining ones of the utterances (362) using the corresponding encoder values (366). As an example, the cluster controller (370) may select, for each transcript filtered by the utterance controller (360), the three utterances with the highest corresponding attention values.

After filtering, the utterances (362) using the attention values (367), the cluster controller (370) clusters the filtered ones of the utterances (362) using the corresponding encoder values (366). In one embodiment, the clustering algorithm may include k-means clustering.

The clusters (372) identify collections of the utterances (362). Each of the clusters (372) may include a centroid that is the average of the encoder values (366) that correspond to the utterances (362) that are part of a cluster.

The topic controller (375) receives the clusters (372) and identifies the topics (378). The topic controller (375) identifies groups of the one or more of the clusters (372) as the topics (378). In one embodiment, the topic controller (375) may use user inputs that define the groups of clusters. In one embodiment, the topic controller (375) may identify groups of clusters grouping together the clusters with respective centroids having distances that are below a distance threshold.

The topic controller (375) may further identify the topic labels (380) for the topics (378). In one embodiment, the topic labels (380) may include a unique numeric value that distinguishes between different ones of the topics (378). In one embodiment, the topic labels (380) may include the text string from the utterance of a group of clusters of a topic in which the encoder value of the utterance has the least distance to the centroid for the group of clusters.

The topic labels (380) are labels for the topics (378). One of the topic labels (380) may be paired to one of the utterances (362).

The classifier model (382) is trained to output predictions of the topic labels (380) given an utterance as an input. The classifier model (382) is trained with pairs of utterances (from the utterances (362)) with topic labels (from the topic labels (380)) are used to train the classifier model (382), which is further described with FIG. 3D.

Figure 3D:
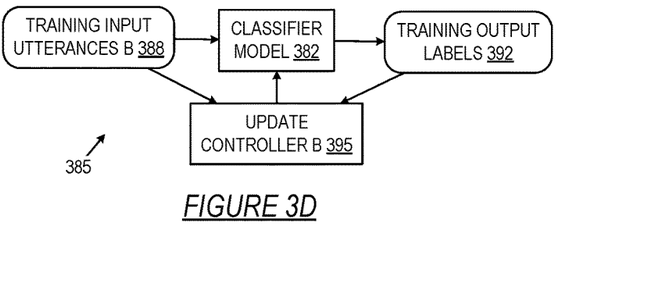

Turning to FIG. 3D, the sequence (385) depicts a flow of data for a method of training the classifier model (382), in accordance with one or more embodiments. The classifier model (382) may be trained after the language model (325) is trained. The sequence (385) may be performed using the system (100) of FIG. 1.

The training input utterances B (388) are input to the classifier model (382). The training input utterances B (388) are a subset of the training input utterances (322) of FIG. 3B used to train the language model (325) of FIG. 3B. The training input utterances B (388) are each paired with a corresponding one of the topic labels (380).

The classifier model (382) receives the training input utterances B (388) and outputs the training output labels (392). In one embodiment, the classifier model (382) receives text (one of the training input utterances B (388)) as input and may output a numeric value. In one embodiment, the output may be a real scalar value within the range of 0 to 1 that identifies the likelihood that one of the training input utterances B (388) matches to any of the topic labels (380) of FIG. 3C. In one embodiment, the output may be a categorical value that predicts one of the topic labels (380) for one of the training input utterances B (388).

The training output labels (392) are outputs from the classifier model (382). In one embodiment, one of training output labels (392) identifies one of the topic labels (380) with one of a number of discrete values that distinguish between the different topic labels (380).

In one embodiment, one of training output labels (392) identifies whether one of the training input utterances B (388) is from a user that is predicted to be a detractor. As an example, the value of "0" (indicating that the utterance did not match to one of the topic labels (380)) may indicate that the user is not a detractor and the value of "1" (indicating that the utterance did match to one of the topic labels (380)) may indicate that the user is a detractor.

The update controller B (395) updates the weights and parameters of the classifier model (382) based on the training input utterances B (388) and the training output labels (392). The output of the classifier model (382) may be compared with expected output based on the input to the classifier model (382). Error is calculated from the difference between the output of the classifier model (382) with respect to the expected output that is backpropagated through the classifier model (382). Backpropagation may be used to update the weights and parameters of the layers of the classifier model (382) to improve the accuracy of the classifier model (382) in predicting the training output labels (392).

Figure 4A:
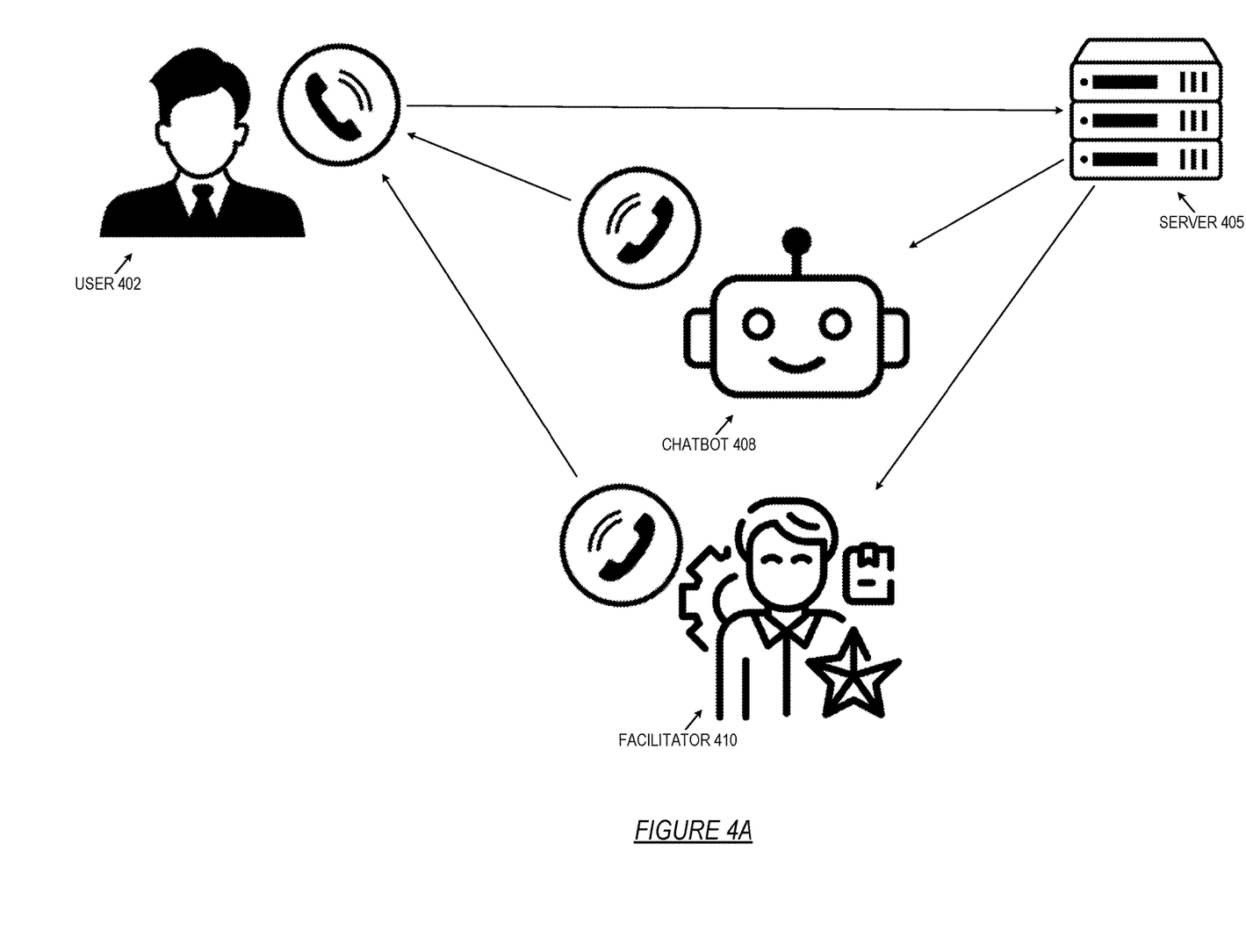

Turning to FIG. 4A, the user (402) establishes a communication session (e.g., a call) with the server (405). The communication session may initially include the chatbot (408) to communicate with the user (402). During the communication session, the server (405) may, in real time, transcribe and analyze the discussion between the user (402) and the chatbot (408) to determine a sentiment of the user (402) to identify whether the user (402) is a detractor or a promoter. The determination of the sentiment is further discussed with FIG. 4B.

At the determine the sentiment of the user (402) based on an utterance from the user (402), the server (405) may update the routing of the communication session. For example, if the sentiment indicates that the user (402) is satisfied and may be a promoter, the communication session may continue to route through the chatbot (408). If the sentiment indicates that the user (402) is not satisfied and may be a detractor, the communication session may be rerouted to include the facilitator (410) who may better be able to address issues facing the user (402).

Figure 4B:
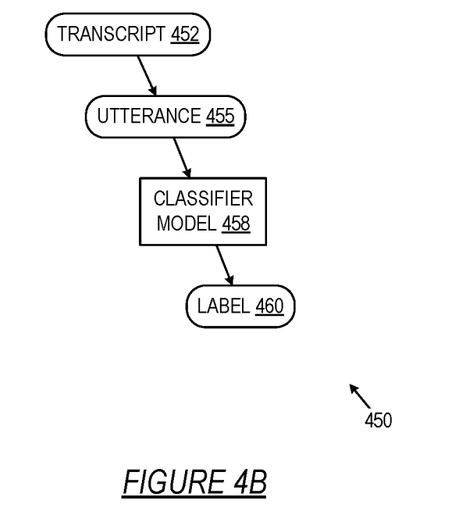

Turning to FIG. 4B, the sequence (450) is the flow of data for determining the label (460) for the utterance (455) from the transcript (452) from the communication session described in FIG. 4A. The transcript (452) may be continuously generated during a communication session. The utterance (455) may be extracted from the transcript in real time.

After being extracted, the utterance (455) is input to the classifier model (458), which outputs the label (460). Based on the value of the label (460), the server (405) of FIG. 4A determines whether to route the communication session to the chatbot (408) of FIG. 4A or the facilitator (410).

Figure 5A:
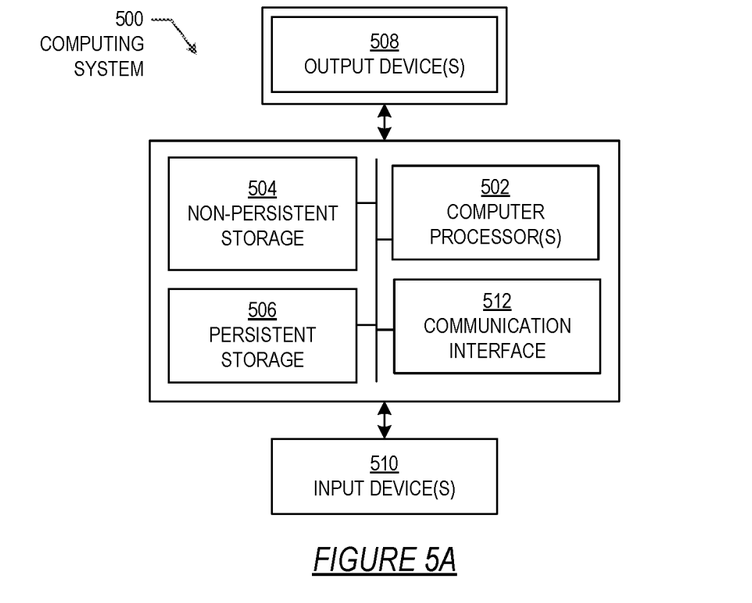
FIG. 5A and FIG. 5B show a computing system and network environment, in accordance with one or more embodiments of the disclosure.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage device(s) (504), persistent storage device(s) (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 5B:
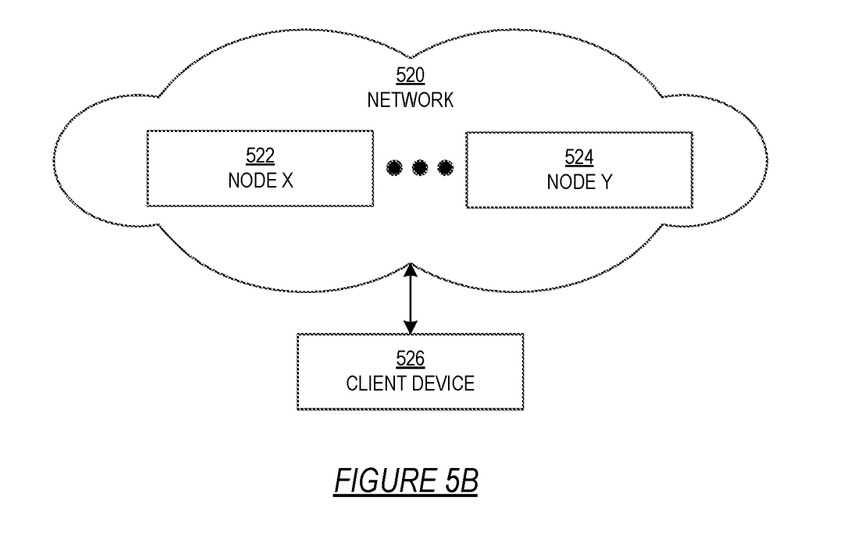

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    training a language model to output a predicted word of an utterance, using training utterances from a set of training transcripts, wherein training the language model comprises:
        converting, by an encoder layer of the language model, the training utterances to encoder values,
        generating, by an attention layer of the language model, attention values using the encoder values, and
        generating the predicted word for the utterance based on the attention values to obtain a trained language model;
    selecting a set of selected transcripts from the set of training transcripts based on training transcript scores;
    filtering the training utterances of the set of selected transcripts using the attention values obtained from the trained language model to obtain filtered training utterances;
    clustering the filtered training utterances using the encoder values obtained from the trained language model to obtain clusters of training utterances;
    grouping the clusters of training utterances into topics;
    assigning topic labels to the topics to generate topic label-training utterance pairs;
    training a classifier model with the topic label-training utterance pairs to output a predicted topic label for a training utterance;
    receiving an utterance from a transcript from a communication session;
    processing the utterance with the trained classifier model to identify a topic label for the utterance; and
    routing the communication session using the topic label for the utterance.

2. The method of claim 1,
wherein training the language model updates one or more of the attention values of the attention layer and the encoder values of the encoding layer.

3. The method of claim 1, further comprising:
routing the communication session to include a facilitator device using the topic label.

4. The method of claim 1, further comprising:
processing the set of training transcripts to generate the training transcript scores using a detractor net promotor model using attention that is trained to predict the training transcript scores from the training transcripts, wherein the detractor net promotor model is updated during training based on comparisons of the training transcript scores to labeled transcript scores.

5. The method of claim 1, further comprising:
filtering the training utterances of the set of selected transcripts using attention values to identify the training utterances, wherein an attention threshold number of the training utterances are selected from one of a selected transcript of the set of selected transcripts.

6. The method of claim 1, further comprising:
clustering the encoder values of the filtered training utterances to generate the clusters of training utterances, wherein a cluster threshold number of the clusters are generated.

7. The method of claim 1, further comprising:
assigning the topic labels to the topics, wherein the topics are selected based on similarity between the clusters of training utterances.

8. The method of claim 1, further comprising:
training the classifier model, wherein a sample threshold number of the topic label-training utterances pairs for each of the topics is selected for training the classifier model.

9. The method of claim 1, further comprising:
processing the utterance with the classifier model, wherein the classifier model comprises an encoder layer and a classification layer.

10. A system comprising:
at least one processor;
an application, which when executed by the at least one processor:
  trains a language model to output a predicted word of an utterance, using training utterances from a set of training transcripts, wherein training the language model comprises:
    converting, by an encoder layer of the language model, the training utterances to encoder values,
    generating, by an attention layer of the language model, attention values using the encoder values, and
    generating the predicted word of the utterance for the training utterances based on the attention values, to obtain a trained language model;
  selects a set of selected transcripts from the set of training transcripts based on training transcript scores;
  filters the training utterances of the set of selected transcripts using the attention values obtained from the trained language model to obtain filtered training utterances;
  clusters the filtered training utterances using the encoder values obtained from the trained language model to obtain clusters of training utterances;
  groups the clusters of training utterances into topics;
  assigns topic labels to the topics to generate topic label-training utterance pairs;
  trains a classifier model with the topic label-training utterance pairs to output a predicted topic label for a training utterance;
  receives an utterance from a transcript from a communication session;
  processes the utterance with the classifier model to identify a topic label for the utterance; and
  routes the communication session using the topic label for the utterance.

11. The system of claim 10, wherein the application, which when executed by the at least one processor, further:
routes the communication session to include a facilitator device using the topic label.

12. The system of claim 10,
wherein training the language model updates one or more of the attention values of the attention layer and the encoder values of the encoding layer.

13. The system of claim 10, wherein the application, which when executed by the at least one processor, further:
processes the set of training transcripts to generate the training transcript scores using a detractor net promotor model using attention that is trained to predict the training transcript scores from the training transcripts, wherein the detractor net promotor model is updated during training based on comparisons of the training transcript scores to labeled transcript scores.

14. The system of claim 10, wherein the application, which when executed by the at least one processor, further:
filters the training utterances of the set of selected transcripts using attention values to identify the training utterances, wherein an attention threshold number of the training utterances are selected from one of a selected transcript of the set of selected transcripts.

15. The system of claim 10, wherein the application, which when executed by the at least one processor, further:
clusters the encoder values of the filtered training utterances to generate the clusters of training utterances, wherein a cluster threshold number of the clusters are generated.

16. The system of claim 10, wherein the application, which when executed by the at least one processor, further:
assigns the topic labels to the topics.

17. The system of claim 10, wherein the application, which when executed by the at least one processor, further:
trains the classifier model, wherein a sample threshold number of the topic label-training utterances pairs for each of the topics is selected for training the classifier model.

18. A method comprising:
processing training transcript scores to select a set of selected transcripts from a set of training transcripts;
training a language model with next word prediction and masking using training utterances from a set of training transcripts to obtain a trained language model;
processing the set of selected transcripts using attention values of the trained language model to filter the training utterances, wherein the attention values are obtained from an attention layer of the trained language model;
clustering encoder values of the training utterances to generate clusters of the training utterances, wherein the encoder values are obtained from an encoding layer of the trained language model and wherein the attention layer is distinct from the encoding layer;

assigning topic labels to topics, wherein one of the topics corresponds to one or more of the clusters; and training a classifier model to identify topic labels for the training utterances by using a processor to update one or more weights of the classifier model, wherein the training utterances are filtered using the attention values for the training utterances from the attention layer of the trained language model and are clustered using the encoder values for the training utterances from the encoder layer of the trained language model.

\* \* \* \* \*